Patented June 7, 1949

2,472,661

UNITED STATES PATENT OFFICE 2,472,661

RESINOUS INTERPOLYMERS

Reynold E. Holmen, Ann Arbor, Mich., assignor to E. I. du Pont de Nemours & Company, Wilmington, Del., a corporation of Delaware.

No Drawing. Application November 29, 1946, Serial No. 713,115

7 Claims. (Cl. 260—73)

This invention relates to interpolymers of a resinous type, and particularly to resinous interpolymers and the reaction products of maleic acid esters of methallyl alcohol, with styrene and the methallyl esters of certain saturated dibasic acids or their derivatives.

Resins produced by co-polymerizing certain methallyl esters of dibasic acids have been found especially valuable as vehicles for formulating white enamels of outstanding gloss, color, retention, heat resistance, stain, grease and mar resistance. They also are less affected by dilute aqueous alkali than are the conventional oil-modified glyceryl phthalate resins.

I have now found that if, instead of copolymerizing merely the monomeric methallyl esters of the dibasic acids, I interpolymerize these monomeric dibasic esters judiciously with monomeric styrene, a great increase in the resistance to alkali is obtained and in addition, the outdoor durability is definitely increased.

This invention therefore, has as its principal object the provision of means for preparing homogeneous resinous products. Another object is to prepare homogeneous resinous products as vehicles for decorative and protective coating compositions. A further object is the preparation of a new type of baking enamel having high resistance to discoloration at high temperatures. An additional object is the preparation of a new type of enamel having high resistance to alkali and improved outdoor durability. Other objects will appear hereinafter.

These objects are accomplished according to the present invention by reacting at elevated temperature the monomers of: (A) dimethallyl maleate, (B) a monomeric diester of methallyl alcohol and certain saturated dibasic acids, and (C) monomeric styrene.

The invention will be more fully understood from the following examples, which are given by way of illustration but not of limitation. The parts are by weight.

Example I

| | |
|---|---|
| (1) Dimethallyl maleate | 179.00 |
| (2) Dimethallyl adipate [1] | 179.00 |
| (3) Styrene | 83.00 |
| (4) Xylol | 250.00 |
| (5) Xylol | 44.00 |
| (6) Benzoyl peroxide | 2.20 |
| (7) Hydroquinone | 0.04 |

[1] Either dimethallyl succinate, sebacate, or azelate, in like amounts is a complete equivalent for the dimethallyl adipate.

Components 1, 2, 3, and 4, were loaded into a three-neck flask equipped with a stirrer, thermometer, reflux condenser, and sampling tube. The charge was heated to 135–140° C. and the solution of 6 in 5 was added slowly through the condenser. The viscosity of the mixture was determined from time to time by removing samples through the sampling tube. When the viscosity reached E (Gardner-Holdt), the addition of the solution of 6 in 5 was discontinued and the temperature was allowed to fall to 125° C. At this temperature the solution of 6 in 5 was again added slowly until the viscosity of the mixture reached G–H, at which point 7 was added to stop all further action of the catalyst, and the batch was allowed to cool. The final constants of the batch were:

Viscosity: G

Specific gravity:

$$\frac{25°\ C.}{25°\ C.} : 0.997$$

Color: Less than 1 (Gardner)

Solids: 34% (dried for 90 minutes at 145° centigrade)

Example II

| | |
|---|---|
| (1) Dimethallyl maleate | 222.00 |
| (2) Dimethallyl methallyloxy succinate [2] | 158.00 |
| (3) Styrene | 100.00 |
| (4) Xylol | 240.00 |
| (5) Xylol | 50.00 |
| (6) Benzoyl peroxide | 2.50 |
| (7) Hydroquinone | 0.05 |

[2] Either a dimethallyl methallyloxy adipate, sebacate, or azelate in like amounts is a complete equivalent for the dimethallyl methallyloxy succinate.

Components 1, 2, 3, and 4 were loaded into a flask equipped as described under Example I. The flask was heated to 145° C. and held at that temperature for about 2½ hours. The temperature was then lowered to 135° C., while ½ of the solution of 6 in 5 was added dropwise. When the charge reached a viscosity of D–E, the temperature was dropped to 125° C., and maintained there until the viscosity reached H. At this point, 7 was added and the batch allowed to cool. The final constants were:

Viscosity H
Specific gravity 0.979
Color less than 1
Solids 31.2%

Example III

| | |
|---|---|
| (1) Dimethallyl maleate | 150.00 |
| (2) Dimethallyl methallyloxy succinate [3] | 224.00 |
| (3) Styrene | 75.00 |
| (4) Xylol | 240.00 |
| (5) Xylol | 50.00 |
| (6) Benzoyl peroxide | 2.40 |
| (7) Hydroquinone | 0.05 |

[3] Either dimethallyl methallyloxy adipate, sebacate, or azelate in like amounts is a complete equivalent for the dimethallyl methallyloxy succinate.

The process was carried out as outlined under Example II. The final constants were:

Viscosity: G-H
Color: Less than 1
Solids: 41%

Example IV

| | |
|---|---|
| (1) Dimethallyl maleate | 220.00 |
| (2) Dimethallyl succinate [4] | 180.00 |
| (3) Styrene | 100.00 |
| (4) Xylol | 240.00 |
| (5) Xylol | 50.00 |
| (6) Benzoyl peroxide | 2.40 |
| (7) Hydroquinone | 0.05 |

[4] Either dimethallyl adipate, sebacate, or azelate in like amounts is a complete equivalent for the dimethallyl succinate.

The process of this example was carried out as outlined under Example I. The final constants were:

Viscosity: H-I
Color: Less than 1
Solids: 42%

Steel panels were coated with the composition of each of the four examples. These were baked from 15 to 30 minutes at temperatures of 350° F. to 400° F., and were partly immersed in a 2% solution of commercial washing powder in water heated to 160° F. Control panels coated with compositions identical with those of the four examples, but without the styrene, were immersed along with the compositions of the four examples. In all cases, the compositions containing the styrene showed a greatly improved resistance to blistering and erosion by the alkaline solution.

The compositions of the four examples were also pigmented with titanium dioxide in a ratio of about 75 parts of pigment to 100 parts of binder, and exposed to similar tests in alkaline solutions, along with controls containing no styrene. Those without the styrene were badly eroded after four days, whereas those containing the styrene showed only fine checking after nine days.

Steel panels coated with the pigmented modifications of the Examples I and II, at 75/100 pigment/binder ratio were exposed for one year, out-of-doors, along with controls containing no styrene. The latter those without styrene, were badly rusted, and the panels were almost completely stripped of enamel after the year's exposure, whereas the pigmented modifications of Examples I and II showed only slight chalking with a few rust spots, at the end of the exposure period.

The pigmented compositions of the four examples, along with the pigmented analogues containing no styrene were baked for two hours at 400° F. Those without the styrene were definitely discolored, whereas those of the four examples all of which contained styrene showed remarkable freedom from discoloration.

It should be noted that in producing the compositions of this invention, it is essential that the components be interpolymerized, since polymers of the individual components are incompatible one with the other. Mixtures only of solutions of the individual polymers give useless products.

I have found that if products of lower viscosity are desired, alphamethyl styrene may be substituted for the styrene without sacrifice of the excellent properties of these new resins. If greater reactivity is desired, the ring-substituted chloro and dichloro styrenes may be substituted for styrene, therefore, where the word "styrene" is used herein, it includes also alphamethyl styrene and the ring substituted chloro and dichlorostyrenes.

In carrying out the process of this invention, it is generally essential that the apparatus be completely free from polymeric products resulting from a previous run of the process in the apparatus. The presence of these polymers interferes seriously with securing homogeneous soluble interpolymers of this invention by leading to premature precipitation of an insoluble product.

The resins of this invention, as exemplified by the examples, contain small amounts of unreacted monomers. If monomer-free resins are desired, they may be secured conveniently by pouring the product of the invention into a non-solvent for the finished resin, such as methanol or hexane. The polymer will be precipitated and the monomer will remain in the solution. The precipitated polymer may then be collected as a monomer-free product. Vacuum distillation may also be used to remove excess monomer.

If desired, the precipitated monomer-free resin may be mixed with small amounts of benzoyl peroxide, whereby a mass is formed from which moldings may be made at elevated temperatures and pressures.

In producing the resins of this invention which will have high resistance to discoloration at high temperatures, resistance to alkaline solutions, and good durability on outside exposure, I have found that the ratios of the monomeric materials, one to the other before interpolymerization, are somewhat critical. I have found, for example, that when the content of dimethallyl maleate is too high (above about 65%), the resulting coating compositions are too hard and brittle for most purposes, and that intercoat adhesion is defective. If this content is too low (under about 30%), the enamel is too soft, and mars too easily. With reference to the ratio of styrene, I prefer to use it in amounts between 15% and 25%. Coating compositions resulting from monomeric mixtures containing less than the 15% of styrene are defective in alkali resistance and in resistance to discoloration at high temperatures, whereas those containing more than 25% are brittle and are lacking in solubility in the solvents. The preferred range of the monomeric diester of methallyl alcohol and dibasic acid is from 10% to 55% based on the total weight of the binder.

The resins of this invention are particularly adapted for use as a vehicle in the preparation of decorative and protective coating compositions such as paints, enamels, etc. They are especially suitable for the production of baking enamels for use on manufactured products where high temperatures are encountered, such as stoves, etc. They are also particularly adapted for the production of baking enamels for general kitchen and bathroom use, where strongly alkaline washing powders are frequently employed in cleansing operations.

It will be apparent from the foregoing that means have been provided for the preparation of a new type of film-forming material from which films may be produced which have high utility as decorative and protective coatings.

It is apparent that many widely different embodiments of this invention may be made without departing from the spirit and scope thereof, and therefore, it is not intended to be limited except as indicated in the appended claims.

I claim:

1. A process of preparing resinous interpolymers which comprises heating to an interpolymerizing temperature (A) from 30 to 65 parts of monomeric dimethallyl maleate (B) from 10 to 55 parts of a monomeric diester resulting from the esterification of methallyl alcohol with a dibasic acid selected from the group consisting of succinic, adipic, sebacic and azelaic acids and their methallyloxy derivatives, and (C) from 15 to 25 parts of monomeric styrene.

2. As a new composition of matter the interpolymer of (A) from 30 to 65 parts of monomeric dimethallyl maleate, (B) from 10 to 55 parts of a monomeric diester resulting from the esterification of methallyl alcohol with a dibasic acid selected from a group consisting of succinic, adipic, sebacic, and azelaic acids, and their methallyloxy derivatives, and (C) from 15 to 25 parts of monomeric styrene.

3. An enamel containing a pigment, and an interpolymer of (A) from 30 to 65 parts of monomeric dimethallyl maleate, (B) from 10 to 55 parts of a monomeric diester resulting from the esterification of methallyl alcohol with a dibasic acid selected from the group consisting of succinic, adipic, sebacic, and azelaic acids, and their methallyloxy derivatives and (C) from 15 to 25 parts of monomeric styrene.

4. A coating composition comprising the reaction product of the interpolymerization of from 30% to 65% of dimethallyl maleate, from 15% to 25% of styrene and from 10% to 55% of a diester of methallyl alcohol with a dibasic acid selected from the group consisting of succinic, adipic, sebacic, and azelaic acids, and their methallyloxy derivatives.

5. An enamel comprising 100 parts of the reaction product of the interpolymerization of from 30 to 65% of dimethallyl maleate, from 15% to 25% of styrene and from 10% to 55% of a diester of methallyl alcohol with a dibasic acid selected from the group consisting of succinic, adipic, sebacic and azelaic acids, and their methallyloxy derivatives and 75 parts of pigment.

6. The enamel of claim 5 in which the pigment is titanium oxide.

7. The process of preparing resinous interpolymers which comprises heating to an interpolymerizing temperature 179 parts of dimethallyl maleate, 179 parts of dimethallyl adipate, and 83 parts of styrene by heating the same to 135° C. to 140° C., during which time benzoyl peroxide is added slowly, continuing the heating until a viscosity of E on the Gardner-Holdt scale is reached, allowing the temperature to fall to 125° C. and continuing adding benzoyl peroxide until a viscosity of G-H is reached, allowing the mass to cool and thereafter grinding a pigment therewith.

REYNOLD E. HOLMEN.

REFERENCES CITED

The following references are of record in the file of this patent:

UNITED STATES PATENTS

| Number | Name | Date |
|---|---|---|
| 2,332,900 | D'Alelio | Oct. 26, 1943 |
| 2,343,483 | Sorenson | Mar. 8, 1944 |

FOREIGN PATENTS

| Number | Country | Date |
|---|---|---|
| 513,221 | Great Britain | Oct. 6, 1939 |